United States Patent Office 3,496,142
Patented Feb. 17, 1970

3,496,142
EPOXIDE RESIN COMPOSITIONS COMPRISING A POLYCARBOXYLIC ACID ANHYDRIDE HARDENER AND A SUBSTITUTED AMIDE ACCELERATOR
Peter Clelford, Saffron Walden, Essex, and John Michael Coulter, Sawston, Cambridge, England, assignors to Ciba Limited, Basel, Switzerland, a company of Switzerland
No Drawing. Filed June 16, 1967, Ser. No. 646,448
Claims priority, application Great Britain, July 6, 1966, 30,400/66
Int. Cl. C08g 30/12
U.S. Cl. 260—47    15 Claims

ABSTRACT OF THE DISCLOSURE

This invention relates to hardenable compositions comprising an epoxide resin, a polycarboxylic acid anhydride as hardener therefor, and, as accelerator for the hardening action, a compound of the general formula:

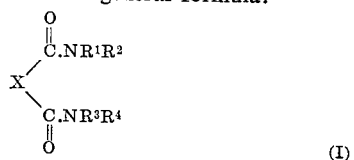

(I)

where X is either the residue $-CH_2(CH_2)_mCH_2-$ (where $m$ is 0 or 1), or a substituted or unsubstituted phenylene or cycloalkylene residue to which the two CO groups are bound through vicinal carbon atoms; and $R^1$, $R^2$, $R^3$ and $R^4$ each denotes a hydrogen atom, or an alkyl, alkenyl, cycloalkyl, cycloalkenyl, aryl or aralkyl group, which may be substituted by halogen, hydroxyl, or nitrile, and $R^1$ and $R^2$, or $R^3$ and $R^4$, but not both, may be linked together to form with the attached nitrogen atom a heterocyclic ring, at least one, but not more than three of $R^1$, $R^2$, $R^3$ and $R^4$ being hydrogen.

This invention relates to the hardening of epoxide resins and, more particularly, to hardenable epoxide resin compositions containing accelerators for the hardening thereof.

It is known that epoxide resins, i.e. substances containing on average more than one 1,2-epoxide group per molecule, may be hardened, i.e. cured, in admixture with polycarboxylic acid anhydrides to form tough, infusible solids having valuable technical properties. To effect this conversion it is generally necessary to maintain the mixture at a high temperature for a considerable period and, to bring about a reduction in this curing time, accelerators for the hardening have been incorporated in the epoxide resin-polycarboxylic acid anhydride mixtures. It is desirable that such accelerators can be mixed with the epoxide resin and polycarboxylic anhydride to form compositions which are stable for a convenient length of time at the normal temperatures of use, i.e. that they have a reasonably long "pot-life," but which can readily be hardened or cured on being heated to a higher temperature. Substances which have been proposed for use as accelerators include unsubstituted amides, such as urea, formamide, acetamide, propionamide, n-butyramide, benzamide, salicylamide, adipamide, and phthalamide. In some cases, the aforesaid unsubstituted amides are difficultly soluble in the epoxide resin; that is disadvantageous if, for example, it is desired to prepare a homogeneous mixture of epoxide resin and accelerator, which is to be stored at room temperature. Others of these amides exert only a modest accelerating effect.

It has now been found that certain substituted amides can be used as accelerators, and the aforesaid disadvantages mitigated or substantially overcome.

The present invention accordingly provides hardenable compositions comprising an epoxide resin, a polycarboxylic acid anhydride as hardener therefor, and, as accelerator for the hardening action a compound of the general formula:

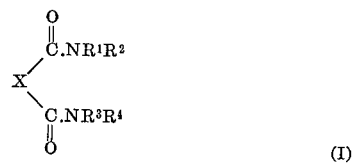

(I)

where X is either the residue $-CH_2(CH_2)_mCH_2-$ (where $m$ is 0 or 1), or a substituted or unsubstituted phenylene or cycloalkylene residue to which the two CO groups are bound through vicinal carbon atoms; and $R^1$, $R^2$, $R^3$ and $R^4$ each denotes a hydrogen atom, or an alkyl, alkenyl, cycloalkyl, cycloalkenyl, aryl or aralkyl group, which may be substituted by halogen, hydroxy, or nitrile, and $R^1$ and $R^2$, or $R^3$ and $R^4$, but not both, may be linked together to form with the attached nitrogen atom a heterocyclic ring, at least one, but not more than three, of $R^1$, $R^2$, $R^3$ and $R^4$ being hydrogen.

Hardened products obtained by curing the aforesaid hardenable compositions at an elevated temperature are also within the scope of the invention.

Preferred accelerators of Formula I are those of the general formula:

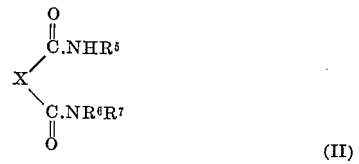

(II)

wherein X is as hereinbefore defined, $R^5$ and $R^6$ are each an alkyl, alkenyl, cycloalkyl, cycloalkenyl, aryl or aralkyl group, which may be substituted by halogen, hydroxyl or nitrile, and $R^7$ is such a group or a hydrogen atom, with the proviso that $R^6$ and $R^7$ may, with the attached nitrogen atom, together form a heterocyclic ring. Especially valuable are those of Formula II in which X is $-CH_2CH_2-$; the phenylene residue:

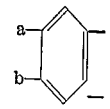

wherein $a$ is hydrogen and $b$ is hydrogen, chlorine, bromine or carboxyl, or $a$ is

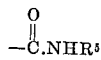

and $b$ is

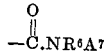

or a cycloalkylene residue

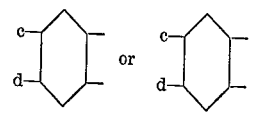

where $c$ and $d$ either are both hydrogen atoms or together form a single bond.

Especially effective and readily available are the compounds of Formula II wherein $R^5$ is an alkyl or monohydroxyalkyl group containing not more than 4 carbon atoms and either $R^6$ is a said group and $R^7$ is a hydrogen atom, or $R^6$ and $R^7$ together with the attached nitrogen atom form a morpholino or piperidino group, and X is $-CH_2CH_2-$ or o-phenylene.

Examples of compounds of Formula I which may be incorporated in the compositions of the present invention are
N,N'-dimethylphthalamide,
N,N'-di-n-propylphthalamide,
N,N'-bis(2-hydroxyethyl)phthalamide,
N,N'-dibenzylphthalamide,
N,N'-dimethylsuccinamide,
N,N'-dimethylcyclohexane-1,2-dicarboxamide,
N,N'-diethylcyclohex-4-ene-1,2-dicarboxamide,
N,N'-dimethyl-3,6-endomethylenecyclohex-4-ene-1,2-dicarboxamide,
N,N'-diethyltrimellitic acid diamide (i.e., N,N'-diethyl-4-carboxybenzene-1,2-dicarboxamide) and
N,N',N'',N'''-tetramethylpyromellitic acid tetra-amide (i.e. N,N',N'',N'''-tetramethylbenzene-1,2,4,5-tetracarboxamide).

The most preferred accelerators are N-benzyl-N',N'-dimethylphthalamide and N-benzyl-N',N'-pentamethylenephthalamide.

Epoxide resins which may be used in the compositions of the present invention include, for example, polyglycidyl esters obtainable by the reaction of a di- or poly-carboxylic acid with epichlorohydrin or glycerol dichlorohydrin in the presence of an alkali. Such polyglycidyl esters may be derived from aliphatic dicarboxylic acids, e.g. oxalic acid, succinic acid, sebacic acid, or dimerised or trimerised linoleic acid and from aromatic dicarboxylic acids such as phthalic acid, isophthalic acid, terephthalic acid, naphthalene-2,6-dicarboxylic acid, diphenyl-2,2'-dicarboxylic acid and ethylene glycol bis(4-carboxyphenyl ether). Specific such polyglycidyl esters are, for example, diglycidyl phthalate, diglycidyl adipate and the diglycidyl esters which correspond to the average formula:

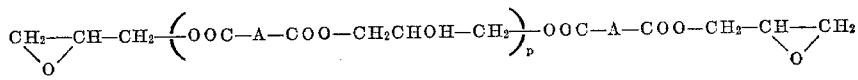

in which A represents a divalent aromatic hydrocarbon radical, such as phenylene group, and $p$ represents a small whole or fractional positive number.

Other epoxide resins which may be used include polyglycidyl ethers, such as those obtainable by the interaction of a dihydric or polyhydric alcohol or a dihydric or polyhydric phenol with epichlorohydrin or a related substance (for example, glycerol dichlorohydrin) under alkaline conditions or, alternatively, in the presence of an acidic catalyst with subsequent treatment with alkali. These compounds may be derived from diols or polyols, such as ethylene glycol, diethylene glycol, triethylene glycol, propane-1,2-diol, propane-1,3-diol, butane-1,4-diol, pentane-1,5-diol, hexane-1,6-diol, hexane-2,4,6-triol, glycerol or N-aryldialkanolamines such as N-phenyldiethanolamine, or preferably from dihydric or polyhydric phenols such as resorcinol, catechol, hydroquinone, 1,4-dihydroxynaphthalene, 1,5-dihydroxynaphthalene, bis(4-hydroxyphenyl)methane, bis(4-hydroxyphenyl)methylphenylmethane, bis(4-hydroxyphenyl)tolylmethanes, 4,4'-dihydroxydiphenyl, bis(4-hydroxyphenyl)sulphone, and, especially 2,2-bis(4-hydroxyphenyl)propane, or phenol-formaldehyde condensation products.

There may further be employed aminopolyepoxides such as are, for example, obtained by the dehydrohalogenation of the reaction products of epihalohydrins and primary or di-secondary amines such as aniline, n-butylamine, bis(4-aminophenyl)methane or bis(4-methylaminophenyl)methane.

Epoxide resins obtained by the epoxidation of cyclic and acylic polyolefins may also be employed, such as vinylcyclohexene dioxide, limonene dioxide, dicyclopentadiene dioxide, 3,4-epoxydihydrodicyclopentadienyl glycidyl ether, the bis(3,4-epoxydihydrodicyclopentadienyl)-ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, the acetal formed between 3,4-epoxycyclohexanecarboxyaldehyde and 1,1-bis(hydroxymethyl)-3,4-epoxycyclohexane, and epoxidised butadienes or copolymers of butadiene with ethylenic compounds such as styrene and vinyl acetate.

Especially suitable epoxide resins are those obtained by the reaction of 2.2-bis(4-hydroxyphenyl)propane with epichlorohydrin in the presence of alkali and having an epoxide content of about 2.0 to 5.88 epoxide equivalents per kilogram.

Polycarboxylic acid anhydrides which may be used as hardeners in the compositions of the present invention include, for example, phthalic anhydride, 1,2,3,6-tetrahydrophthalic anhydride, methylendomethylene-1,2,3,6-tetrahydrophthalic anhydride, hexachloroendomethylene-1,2,3,6-tetrahydrophthalic anhydride, endomethylene-1,2,3,6-tetrahydrophthalic anhydride, hexahydrophthalic anhydride, pyromellitic dianhydride, maleic anhydride, succinic anhydride, dodecenylsuccinic anhydride, polysebacic anhydride, and polyazelaic anhydride. The preferred anhydride hardeners are 1,2,3,6-tetrahydrophthalic anhydride, methylendomethylene-1,2,3,6-tetrahydrophthalic anhydride, hexahydrophthalic anhydride and dodecenylsuccinic anhydride.

The proportions of polycarboxylic acid anhydride and accelerator to be used will depend on such factors as the epoxide content of the epoxide resin used, the nature of the anhydride hardening agent, and the curing conditions which may be employed. Optimum proportions may readily be determined by routine experimentation but, by way of illustration, from about 0.4 to 1.1 anhydride group equivalents of the polycarboxylic acid anhydride per 1,2-epoxy equivalent of the 1,2-epoxide resin, and from about 0.025 to 10 parts by weight of the accelerator per 100 parts by weight of the 1,2-epoxide resin, may be used.

Conveniently, the compositions of the present invention are supplied as a two-component pack, one component comprising the epoxide resin and the accelerator of Formula I, and the other the polycarboxylic acid anhydride hardener. The compositions of the present invention may contain reactive diluents such as phenyl glycidyl ether or n-butyl glycidyl ether. They may also contain fillers, plasticizers, and colouring agents, for example, asphalt, bitumen, glass fibres, mica, quartz powder, cellulose, kaolin, finely-divided silica (such as that available under the registered trademark "AEROSIL"), or metal powder.

Preferably, they also contain as co-accelerator a polyhydric alcohol, such as propane-1,2-diol, glycerol, a polypropylene glycol, or an addition product of 1 mol of a dihydric phenol, especially 2,2-bis(4-hydroxyphenyl)propane, with 2 or more mols of ethylene oxide or propylene oxide.

The aforesaid compositions may be used as, for example, casting, potting, encapsulating, coating, laminating and adhesive resins.

The following examples illustrate the invention. Unless otherwise specified "parts" denotes parts by weight. Temperatures are given in degrees centigrade. Heat deflection temperatures under load of the cured compositions were determined, unless otherwise specified, by a modification of the Martens D.I.N. procedure, in which a smaller sample, viz. 76 mm. x 19 mm. x 3.2 mm. (compared with a sample size of 120 mm. x 15 mm. x 10 mm. specified in the D.I.N. procedure), and a maximum fibre stress of 12.5 kg./sq. cm. (Compared with the specified 50 kg./sq. cm.), were employed. Such results, while not exactly equivalent to those which would be obtained by the original procedure are, however, mutually comparable.

The new accelerators were prepared as follows:

N,N'-dimethylphthalamide

Powdered phthalimide (20 g., 0.136 g.-mole) was shaken at room temperature with 33% aqueous methylamine (30 ml., 0.22 g.-mole) until the imide had dissolved. The mixture became warm, and yellow crystals separated after about 3 minutes. The crystals were filtered off, and dried in vacuo at room temperature. 18.2 g. (70% of theory) of N,N'-dimethylphthalamide were obtained as white crystals having a melting point of 184–5° C.; Spring and Woods report (J. Chem. Soc., 1945, 625) a melting point of 185° C.

N,N'-di-n-propylphthalamide

This was prepared similarly, from n-propylamine. On recrystallisation from aqueous methanol, the desired product, having a melting point of 134–5° C., was obtained Elemental analysis gave the following results: Found: C=68.7%; H=8.4%; N=10.7%. $C_{14}H_{20}N_2O_2$ requires: C=67.8%; H=8.1% and N=11.4%.

N,N'-bis(2-hydroxyethyl)phthalamide

This was prepared similarly, from ethanolamine. The product was obtained as a glassy solid, which could not be crystallised.

N,N'-dimethylsuccinamide

A mixture of succinic anhydride (25 g., 0.25 g.-mole) and 33% aqueous methylamine (134 ml., 1.0 g-mole) was heated to reflux for 48 hours. Water was removed by distillation in vacuo, and the residue was crystallised from ethyl acetate. The product so obtained had a melting point of 173–5° C. Hurwitz et al. report (J. Amer. Chem. Soc., 1955, 77 3251) a melting point for N,N'-dimethyl-succinamide of 170–3° C.

N-benzyl-N',N'-(pentamethylene)phthalamide

N-benzylphthalimide was prepared by the method of Varags (Chem. Abs. 1940, 34, 1982). Thus a mixture of benzylamine (53 g., 0.5 g.-mole), phthalic anhydride (111 g., 0.75 g.-mole) and glacial acetic acid (300 ml.) was heated to reflux for 1 hour. Water (100 ml.) was then added, and the mixture heated to boiling. On cooling, N-benzylphthalimide (79 g., 67% of theory) separated: it had a melting point of 116–7° C.

N-benzylphthalimide so obtained (30 g., 0.126 g.-mole) was heated at 90° C. with piperidine (12 g., 0.141 g.-mole) until it had dissolved. The mixture was allowed to cool slowly to room temperature. The crystals which separated were filtered off and recrystallised from ethyl acetate. The desired compound of formula:

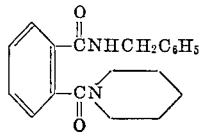

was obtained in a 36 g.-yield (89% of theory), as white crystals of melting point 137–9° C. Elemental analysis gave the following results: Found: C=74.5%; H=7.1%; N=8.6%. $C_{20}H_{22}N_2O_2$ requires: C=74.5%; H=6.8%; N=8.7%.

N-benzyl-N',N'-dimethylphthalamide

N-benzylphthalimide, prepared by the method of Varags as described above, (25.5 g., 0.1 g.-mole) was treated with dimethylamine (68 g., 1.5 g.-mole) in chloroform for 15 hours at room temperature. After removal of solvent under reduced pressure, the residue was recrystallised from ethyl acetate. The product melted at 93–4° C. Elemental analysis gave the following results: Found: N=9.72%; 9.90%. $C_{17}H_{18}N_2O_2$ requires: N=9.93%.

Examples 1–11

An epoxide resin employed, hereinafter designated "Epoxy resin I," was obtained in a conventional manner by the reaction of bisphenol A with epichorohydrin in the presence of alkali. It had an epoxide content of 5.11 equiv./kg., and a viscosity of 275 poises at 21° C. A second epoxide resin employed, hereinafter designated "Epoxy resin II," was obtained by reaction of such a polyglycidyl ether of bisphenol A with a further quantity of bisphenol A: it had an epoxide content of 3.6–4.2 equiv./kg., and a softening point, as measured by the ring and ball method, of about 18° C.

Polyhydric alcohols incorporated in the curable compositions were:

Polyol A.—propane-1,2-diol.

Polyol B.—a bisphenol A-ethylene oxide addition product, of formula:

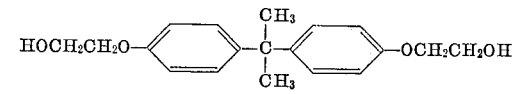

Polyol C.—a bisphenol A-propylene oxide addition product of formula:

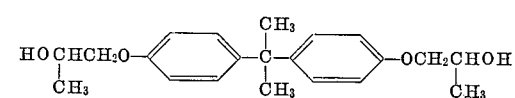

The pot-life of the curable compositions, i.e. the period before which the composition gels, was assessed by noting the time taken at the temperature indicated for the viscosity of the composition to increase to 15 poises at that temperature. Pot-lives of various compositions are shown in Table I.

TABLE I

| Example Number: | Epoxy resin used | 1,2,3,6-tetrahydro-phthalic anhydride (parts) | Amide Name | Parts | Polyhydric alcohol Name | Parts | Time to reach viscosity of 15 poises at 120° C. (minutes) |
|---|---|---|---|---|---|---|---|
| | I | 0 | N,N'-di-n-propyl-phthalamide | 1 | | | (1) |
| | I | 0 | N,N'-di-n-butyl-phthalamide | 1 | | | (1) |
| | I | 0 | N,N'-bis(2-hydroxyethyl) phthalamide | 1 | | | (2) |
| | II | 0 | N,N'-dimethylphthalamide | 0.5 | Polyol B | 10 | (3) |
| | II | 50 | | | | | Approx. 500 |
| | II | 50 | | | Polyol B | 10 | 260 |
| | II | 50 | | | Polyol C | 10 | 315 |
| | II | 50 | Phthalamide | 1 | | | 109 |
| | II | 50 | ...do... | 0.5 | | | 117 |
| | II | 50 | ...do... | 0.5 | Polyol A | 2 | >315 |
| | II | 50 | ...do... | 0.5 | Polyol B | 10 | 142 |
| | II | 50 | Benzamide | 1 | | | 180 |
| 1 | II | 50 | N,N'-dimethylphthalamide | 0.1 | | | <30 |
| 2 | II | 50 | ...do... | 0.05 | | | 60 |
| 3 | II | 50 | ...do... | 0.1 | Polyol B | 10 | 36 |
| 4 | II | 50 | ...do... | 0.05 | ...do... | 10 | 59 |
| 5 | II | 50 | N,N'-bis(2-hydroxyethyl) phthalamide | 0.75 | ...do... | 10 | 44 |
| 6 | II | 50 | ...do... | 0.5 | ...do... | 10 | 93 |
| 7 | II | 50 | N,N'-dimethylsuccinamide | 0.5 | | | 50 |
| 8 | II | 50 | ...do... | 0.5 | Polyol B | 10 | 90 |
| 9 | II | 50 | N-benzyl-N',N'-(pentamethylene)-phthalamide | 0.1 | | | 135 |
| 10 | II | 50 | ...do... | 0.1 | Polyol B | 10 | 80 |
| 11 | II | 50 | N-benzyl-N',N'-dimethylphthalamide | 0.1 | | | 57 |

[1] Not gelled after 10 days at 150° C.
[2] Not gelled after 6 days at 150° C.
[3] Not gelled after 6 days.

From the above results, it will be seen that the substituted amides employed alone had negligible curing effect, but greatly accelerated the curing action of the polycarboxylic acid anhydride. Phthalamide and benzamide dissolved in the epoxy resin only after prolonged heating, whereas the accelerators of this invention dissolved readily.

Example 12–14

Heat deflection temperatures under load of cured compositions of the present invention are shown in the following Table II. In each case, the curable compositions contained 100 parts of Epoxy resin II and 50 parts of 1,2,3,6-tetrahydrophthalic anhydride.

TABLE II

| Example Number | Accelerator Name | Parts | Polyhydric alcohol Name | Parts | Curing cycle | Heat deflection temperature, °C. |
|---|---|---|---|---|---|---|
|  |  |  | Polyol B | 10 | 4 hours at 130° C | (1) |
|  |  |  | do | 10 | 24 hours at 130° C | 95 |
| 12 | N,N'-dimethyl-phthalamide | 0.05 | do | 10 | do | 105 |
| 13 | N,N'-di-n-propyl-phthalamide | 1 |  |  | 4 hours at 130° C | 96 |
| 14 | do | 1 |  |  | 24 hours at 130° C | 103 |

1 Not gelled.

Example 15

Samples of a composition comprising Epoxy resin I (100 parts), hexahydrophthalic anhydride (80 parts) and N-benzyl-N',N'-(pentamethylene) phthalamide (2 parts) were heated at 140° C. for various periods of time, the electrical dissipation factor (the tangent of the loss angle, tan δ) of the heated samples being plotted against the curing time. The optimum curing time, i.e. that interval after which no substantial decrease in the dissipation factor occurred, was found to be 100 minutes. For purposes of comparison, the proportion of a conventional accelerator, N-benzyldimethylamine, required per 100 parts of Epoxy resin I and 80 parts of hexahydrophthalic anhydride to effect cure after heating together for 100 minutes at 140° C. was similarly determined: this proportion was found to be 0.23 part.

Compositions containing the above-mentioned proportions of Epoxy resin I and hexahydrophthalic anhydride, together with accelerator, were heated at 40° C., and their viscosities compared by means of a Gallenkamp Torsion viscometer, the degree of rotation of the viscometer bob being inversely proportional to the viscosity of the compositions.

TABLE III

| Accelerator Name | Parts | Time hours at 40° C. | Viscometer reading (degrees rotation) at 40° C. |
|---|---|---|---|
|  |  | 6 | 330 |
|  |  | 32 | 326 |
|  |  | 54 | 318 |
|  |  | 122 | 316 |
| N-benzyl-N',N'-(pentamethylene) phthalamide | 2 | 5 | 325 |
|  |  | 29 | 321 |
|  |  | 53.5 | 320 |
|  |  | 122 | 311 |
| N-benzyldimethylamine | 0.23 | 5 | 291 |
|  |  | 30.5 | 272 |
|  |  | 51 | 247 |
|  |  | 120 | Gelled |

It will be seen that, under these conditions, the accelerator of the present invention was "latent," i.e. had negligible effect on the resin, whereas the composition containing the conventional accelerator had undergone a significant degree of cure within 5 days.

We claim:

1. A hardenable composition of matter comprising an epoxide resin, a polycarboxylic acid anhydride as curing agent therefor, and, as accelerator for the curing action, a compound of the general formula:

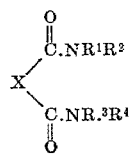

where X is a divalent radical selected from the group consisting of the residue —$CH_2(CH_2)_{n-1}CH_2$—, where $n$ is an integer of at least 1 and at most 2, an ortho-phenylene residue, a halogen substituted ortho-phenylene residue, a carboxy-ortho-phenylene residue, a bis(carboxamido)-ortho-phenylene residue, a cycloalkenylene residue and a cycloalkylene residue, the two CO groups being bound through vicinal endocyclic carbon atoms of the said cycloalkenylene residue and cycloalkylene residue and $R^1$, $R^2$, $R^3$ and $R^4$ each are members selected from the group consisting of hydrogen atom, alkyl, hydroxylalkyl, alkenyl, cycloalkyl, cycloalkenyl, aryl, aralkyl, halogenalkyl and cyanoalkyl group and $R^1$ and $R^2$ form together with the attached nitrogen atom a heterocyclic ring selected from the group consisting of morpholino ring and piperidino ring, with the proviso that at least one but not more than three of $R^1$, $R^2$, $R^3$ and $R^4$ are hydrogen.

2. A hardenable composition of matter comprising an epoxide resin, a polycarboxylic acid anhydride as curing agent therefor, and as accelerator for the curing action a compound of the general formula $$\begin{array}{c} O \\ \| \\ C.NHR^5 \\ X \\ C.NR^6R^7 \\ \| \\ O \end{array} \quad (II)$$

where $X_1$ is a divalent radical selected from the group consisting of ortho-phenylene residue, tetrahydrophenylene-1,2 residue, hexahydrophenylene-1,2 residue and the residue of formula $CH_2(CH_2)_{n-1}CH_2$—, where $n$ is an integer of at least one and at most 2, and $R^5$, $R^6$ and $R^7$ each are members selected from the group consisting of hydrogen atom, alkyl group with 1 to 4 carbon atoms, hydroxyalkyl group with 1 to 4 carbon atoms and benzyl group, and together R⁶ and R⁷ form with the attached nitrogen atom a heterocyclic ring selected from the group consisting of morpholino ring and piperidino ring, with the proviso that not more than two of $R^5$, $R^6$ and $R^7$ are hydrogen.

3. A composition as claimed in claim 2, wherein the accelerator is N-benzyl-N',N'-dimethylphthalamide.

4. A composition as claimed in claim 2 wherein the accelerator is N-benzyl - N',N' - pentamethylene-phthalamide.

5. A composition as claimed in claim 2, wherein the accelerator is N,N'-dimethylphthalamide.

6. A composition as claimed in claim 2, wherein the accelerator is N,N'-di-n-propyl-phthalamide.

7. A composition as claimed in claim 2, wherein the accelerator is N,N'-bis(2-hydroxyethyl) phthalamide.

8. A composition as claimed in claim 2, wherein the accelerator is N,N'-dimethyl-succinimide.

9. A composition as claimed in claim 2, wherein the accelerator is N,N'-di-n-butyl-phthalamide.

10. A composition according to claim 1, wherein the polycarboxylic acid anhydride is a member selected from the group consisting of 1,2,3,6-tetrahydrophthalic anhydride, methyl-endomethylene - 1,2,3,6 - tetrahydrophthalic anhydride, hexahydrophthalic anhydride and dodecenyl-succinic anhydride.

11. A composition according to claim 1, wherein the epoxide resin is one obtained by the reaction of 2,2- bis (4-hydroxyphenyl)-propane with epichlorohydrin in the presence of alkali and having an epoxide content of 2.0 to 5.88 epoxide equivalents per kilogram.

12. A composition according to claim 1, containing from 0.4 to 1.1 anhydride group equivalents of the polycarboxylic acid anhydride per 1,2-epoxy equivalent of the 1,2-epoxide resin, and from 0.025 to 10 parts by weight of the accelerator per 100 parts by weight of the 1,2-epoxide resin.

13. A composition according to claim 1 which further contain as co-accelerator a polyhydric alcohol.

14. A composition according to claim 13, wherein the polyhydric alcohol is a member selected from the group consisting of propane-1,2-diol, glycerol, a polypropyleneglycol and addition products of 1 mol of a dihydric phenol with at least 2 mols of a member selected from the group consisting of ethylene oxide and propylene oxide.

15. A composition according to claim 14, wherein the polyhydric alcohol is an addition product of 1 mol of 2,2-bis(4-hydroxyphenyl) propane with 2 mols of a member selected from the group consisting of ethylene oxide and propylene oxide.

References Cited

UNITED STATES PATENTS

| | | | |
|---|---|---|---|
| 2,728,744 | 12/1955 | May et al. | 260—47 |
| 2,731,444 | 1/1956 | Greenlee | 260—47 |
| 2,955,101 | 10/1960 | Bruin et al. | 260—47 |
| 3,196,153 | 7/1965 | Dazzi | 260—268 |
| 3,379,685 | 4/1968 | Preininger et al. | 260—47 |
| 2,975,195 | 3/1961 | Batzer et al. | 260—348 |

WILLIAM H. SHORT, Primary Examiner

HOWARD SCHAIN, Assistant Examiner

U.S. Cl. X.R.

260—2, 17.2, 28, 33.2, 37, 51, 59, 78.4